(12) United States Patent
Ito

(10) Patent No.: US 6,924,910 B2
(45) Date of Patent: Aug. 2, 2005

(54) IMAGE FORMING APPARATUS AND IMAGE FORMING METHOD

(75) Inventor: Shinsaku Ito, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 903 days.

(21) Appl. No.: 09/922,734

(22) Filed: Aug. 7, 2001

(65) Prior Publication Data

US 2003/0030849 A1 Feb. 13, 2003

(51) Int. Cl.$^7$ .......................... G06K 15/00; H04N 1/40
(52) U.S. Cl. .................. 358/3.01; 358/471; 358/448; 358/3.04
(58) Field of Search ............................ 358/1.3, 3.01, 358/3.04, 3.29, 3.22, 401, 443, 447, 448, 461, 465

(56) References Cited

U.S. PATENT DOCUMENTS

| | | | | | |
|---|---|---|---|---|---|
| 5,381,425 A | * | 1/1995 | Bitzer et al. | ............... | 714/793 |
| 5,724,152 A | * | 3/1998 | Hayashi et al. | ............ | 358/296 |
| 6,058,191 A | * | 5/2000 | Quan | .................... | 380/203 |
| 6,464,641 B1 | * | 10/2002 | Pan et al. | ................... | 600/453 |
| 6,651,739 B2 | * | 11/2003 | Arndt et al. | ........... | 166/250.03 |
| 2002/0021303 A1 | * | 2/2002 | Matsui et al. | ............... | 345/611 |

FOREIGN PATENT DOCUMENTS

| JP | 9-261467 | * 10/1997 | .......... H04N/1/405 |
|---|---|---|---|
| JP | 10-304189 | 11/1998 | ............ H04N/1/40 |

* cited by examiner

Primary Examiner—Jerome Grant, II
(74) Attorney, Agent, or Firm—Foley & Lardner LLP

(57) ABSTRACT

The image forming apparatus and image forming method according to the present invention have an object of outputting a latent image formed on an intermediate recording medium as a stable image when it is developed with toner on a medium such as paper or the like, to improve more the concentration of pixel values, by adding all of N pixels in N-pixel modulation and rearranging them with a screen-line position as a reference situated at the center, thereby to reduce boundaries between image portions and non-image portions in the sub-scanning direction. Specifically, to concentrate image parts of image signals of N pixels, pixel values of all consecutive pixels in the main scanning direction are added, and the pixels are rearranged with a screen-line position as a reference situated at the center, based on the addition result. If the addition result exceeds the maximum value of one pixel, the exceeding pixel is rearranged and outputted.

10 Claims, 3 Drawing Sheets

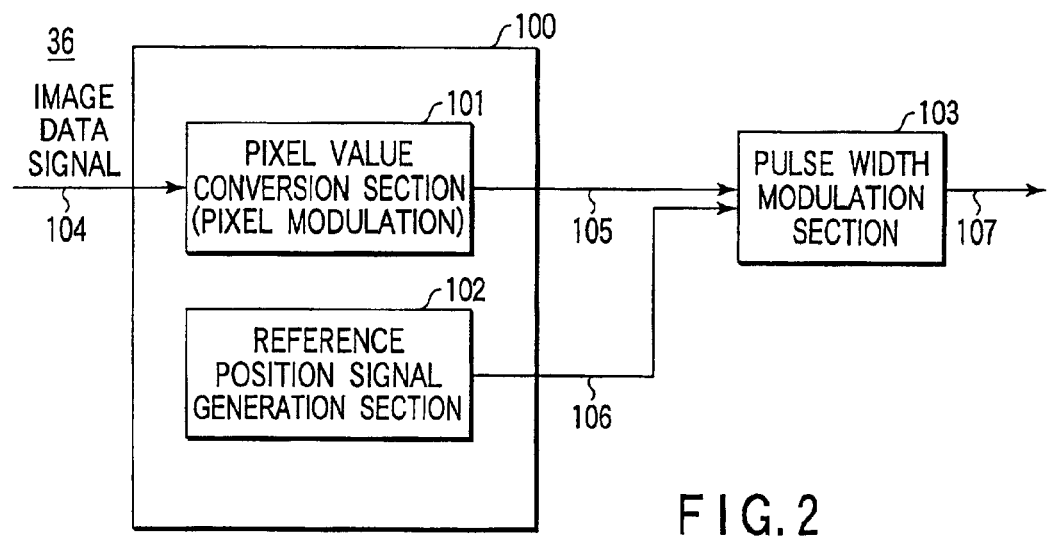
FIG. 2
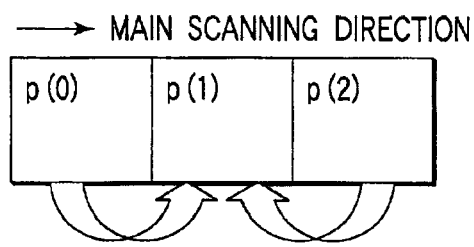
FIG. 3
| 1 | 1 | 3 |
|---|---|---|
| 2 | 0 | 1 |
| 0 | 1 | 1 |
| 3 | 0 | 0 |
FIG. 4

IMAGE FORMING APPARATUS AND IMAGE FORMING METHOD

BACKGROUND OF THE INVENTION

In general, in an electrophotographic recording method as a recording method for a PPC, scanning is performed with a laser to form a latent image on an intermediate recording medium. The latent image is subjected to toner development to achieve image formation. In electrophotographic recording, the boundary between an image portion and a non-image portion is an intermediate transit area where toner development is unstable and exposure with a laser and toner development of a latent image are insufficient.

With respect to pixels which are consecutive in the main scanning direction, a method is taken in which pixel modulation which exposes pixels subjected to pulse width modulation is carried out for every several pixels together by laser driving, thereby eliminating an image portion and a non-image portion so that image formation is stabilized.

For example, in conventional three-pixel modulation, pixel values of two pixels among three consecutive pixels in the main scanning direction are added to concentrate the pixel values on one pixel.

However, in cases where pixel modulation (particularly three or more pixels) according to the conventional method is carried out on an error-diffused image of a multi-value level which is as low as about four to eight values, the pulse width is so coarse that continuity of pixels in the sub-scanning direction is difficult to maintain. Therefore, the screen-line structure has no smoothness so that the structure comes to have conspicuous boundaries between image portions and non-image portions.

In addition, the pixel density is low in a high-light portion so that the structure comes to be particularly unstable.

In this respect, as a relevant technique, Jpn. Pat. Appln. KOKAI Publication No. 10-304189 discloses a technique concerning an image forming apparatus and an image forming method, which subjects multi-value data to pulse width modulation in units of multiple pixels using a dither matrix having a threshold level which changes in synchronization with the screen-line position, thereby forming a screen-line structure.

BRIEF SUMMARY OF THE INVENTION

The present invention has been made in view of the above situation and has the object of outputting a latent image formed on an intermediate recording medium as a stable image when it is developed with toner on a medium such as paper to improve the concentration of pixel values by adding all of N pixels in N-pixel modulation and rearranging them with a screen-line position as a reference situated at the center, thereby reducing boundaries between image portions and non-image portions in the sub-scanning direction. In this manner, the frequencies of screen-lines and boundary lines of non-image portions are reduced (smoothed) to realize a smooth and stable screen-line structure, thereby achieving high image quality.

To achieve this object, an image forming apparatus according to the present invention comprises: a read section which reads image signals in units of a predetermined number of pixels; an addition section which adds pixel values of all consecutive pixels in a main scanning direction to concentrate image parts of image signals of pixels, which are read by the read section; a conversion section which rearranges the pixels beside a screen-line position based on an addition result, and which rearranges and outputs an excessive value if the addition result exceeds the maximum value of one pixel; an output section which outputs a laser beam based on the output signal of the conversion section; a latent image forming section which forms a latent image on a photosensitive member by the laser beam; and an image forming section which develops the formed latent image with toner to achieve image formation.

Further, an image forming apparatus according to the present invention comprises: a read section which reads image signals in units of a predetermined number of pixels; a pseudo gradation processing section which performs pseudo gradation processing with respect to the image signals; a pixel conversion section which receives a quantized image data signal after the pseudo gradation processing, performs pixel value conversion for the purpose of pixel modulation, and outputs it as an image data signal; a pulse position signal generation section which outputs a pulse position signal indicating the laser drive position for a pixel; a pulse width modulation section which receives the image data signal and the pulse position signal, and outputs a laser drive pulse to a laser driver; a laser beam output section which outputs a laser beam based on the laser drive pulse; a latent image forming section which forms a latent image on a photosensitive member by the laser beam; and an image forming section which develops the formed latent image with toner to achieve image formation.

In addition, an image forming method according to the present invention comprises: a first step of reading image signals in units of a predetermined number of pixels; a second step of adding pixel values of all consecutive pixels in a main scanning direction to concentrate image parts of the image signals of pixels which are read; a third step of rearranging the pixels with a screen-line position situated at a center based on an addition result, and of rearranging and outputting an excessive value if the addition result exceeds the maximum value of one pixel; a fourth step of outputting a laser beam based on the output signal; a fifth step of forming a latent image on a photo-sensitive member by the laser beam; and a sixth step of developing the formed latent image with toner to achieve image formation.

Further, an image forming method according to the present invention comprises: a step of reading image signals in units of a predetermined number of pixels; a step of performing pseudo gradation processing with respect to the image signals; a step of receiving a quantized image data signal after the pseudo gradation processing, performing pixel value conversion for the purpose of pixel modulation, and outputting it as an image data signal; a step of outputting a pulse position signal indicating the laser drive position for a pixel; a step of receiving the image data signal and the pulse position signal, and outputting a laser drive pulse to a laser driver; a step of outputting a laser beam based on the laser drive pulse; a step of forming a latent image on a photosensitive member by the laser beam; and a step of developing the formed latent image with toner to achieve image formation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing a specific structure including at least one part of an image processing section 36 in an image forming apparatus according to an embodiment of the present invention;

FIG. 3 is a view showing three consecutive pixels;

FIG. 4 is a view showing pixel values of a 4-valued image after pseudo gradation processing such as error diffusion;

DETAILED DESCRIPTION OF THE INVENTION

In the following, an embodiment of the present invention will be explained with reference to the drawings.

Figure 1:
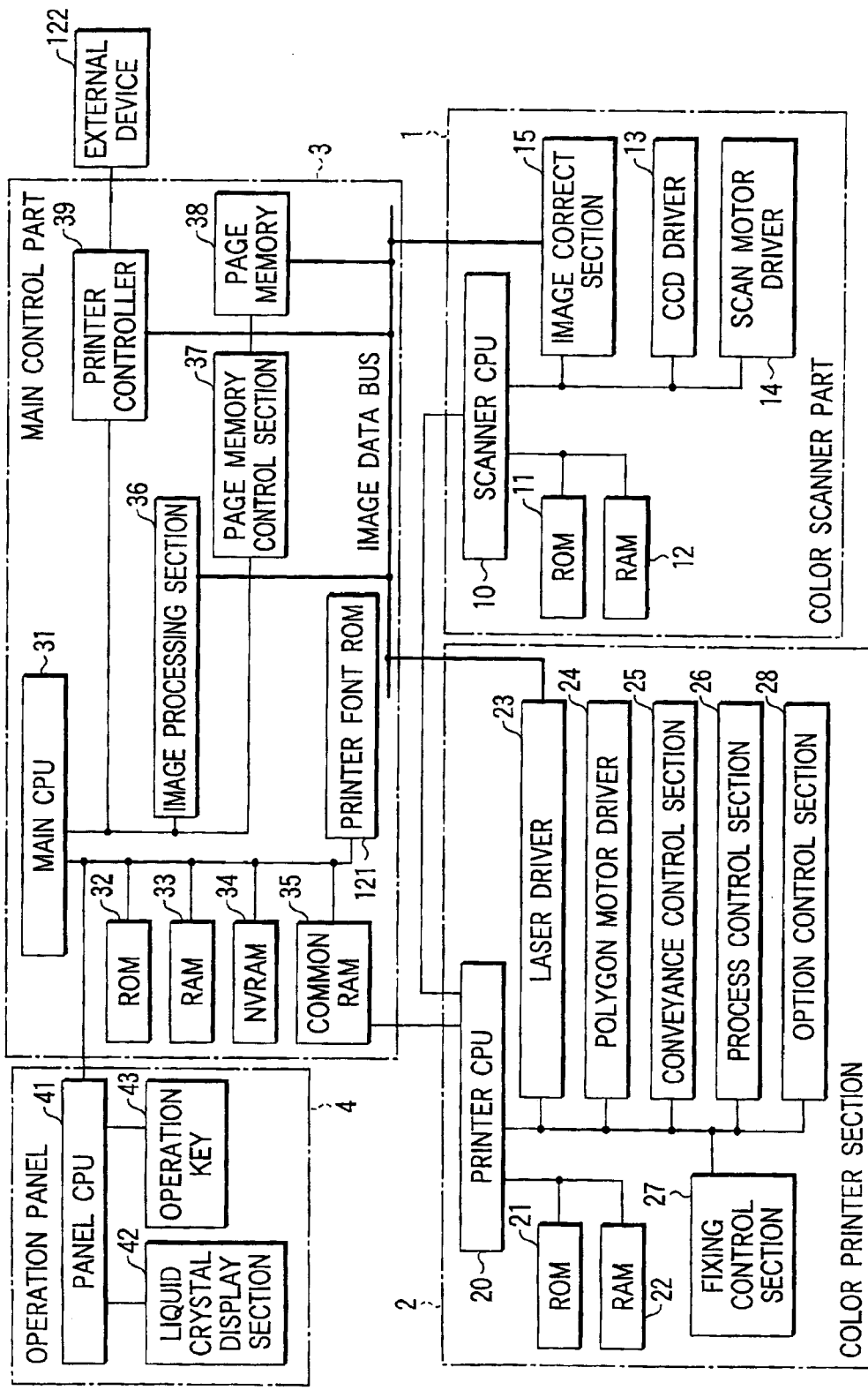
FIG. 1 is a view schematically showing the electrical connection of an image forming apparatus and the flow of signals for control according to the present invention.

Explanation will be made with FIG. 1, showing electrical connection of an image forming apparatus such as a digital color/monochrome copying machine, which reads a color image or a monochrome image on an original document and forms a copy image thereof according to the present invention, and the flow of signals for control.

This image forming apparatus is roughly divided into a scanner section 1, a printer section 2, a main control section 3, and an operation panel 4. The scanner section 1 functions as an input means which reads and inputs a color image on an original document. The printer section 2 functions as an image output means (recording device) which forms a copy image of an input color image.

Further, a control system comprises a main CPU 31 in the main control section 3, a scanner CPU 10 in the scanner section 1, and a printer CPU 20 in the printer section 2.

The main CPU 31 performs bi-directional communication through the printer CPU 20 and a common RAM 35. That is, the main CPU 31 outputs an operation instruction signal to the printer CPU 20 through the common RAM 35. Upon receipt of it, the printer CPU 20 returns a status signal to the main CPU 31.

The printer CPU 20 and the scanner CPU 10 perform serial communication with each other.

That is, the printer CPU 20 outputs an operation instruction signal to the scanner CPU 10. Upon receipt of it, the scanner CPU 10 returns a status signal to the printer CPU 20.

The main control section 3 specifically comprises a main CPU 31, a ROM 32, a RAM 33, a NVRAM (Nonvolatile RAM) 34, a common RAM 35, an image processing section 36, a page memory control section 37, a page memory 38, a printer controller 39, and a printer font ROM 121.

The main CPU 91 controls the entire image forming apparatus. The ROM 32 previously stores a control program and the like. The RAM 33 temporarily stores data. The NVRAM 34 is a nonvolatile memory backed up by a battery (not shown). This NVRAM 34 is structured so as to maintain stored data even when the power source is shut off. The common RAM 35 is used to perform bi-directional communication between the main CPU 91 and the printer CPU 20. The page memory control section 37 stores image information into the page memory 38 and reads data from the page memory 38. The page memory 38 has an area where image information of multiple pages can be stored and is formed to be capable of storing data obtained by compressing image information from the scanner section 1 for every page. The printer font ROM 121 stores font data corresponding to print data. The printer controller 39 develops print data from an external device 122 such as a personal computer, into image data by use of the font data stored in the printer font ROM 121 at a resolution corresponding to data indicating resolution attached to the print data.

The scanner section 1 comprises a scanner CPU 10, a ROM 11, a RAM 12, a CCD driver 13, a scan motor driver 14, an image correction section 15, and the like.

The scanner CPU 10 controls the entire scanner section 1. The ROM 11 previously stores a control program and the like. The RAM 12 temporarily stores data. The CCD driver 13 drives a color image sensor. The scan motor driver 14 controls rotation of a scan motor which moves a first carriage and the like (not shown).

The image correction section 15 comprises an A/D conversion circuit, a shading correction circuit, a line memory, and the like, which are not shown. This A/D conversion circuit converts each of the analog signals for R, G, and B which are output from the color image sensor (not shown). The shading correction circuit corrects changes of the threshold level with respect to an output signal from the color image sensor due to variations of the color image sensor or environmental temperature change. The line memory serves to store temporarily a digital signal from the shading correction circuit which has been subjected to shading correction.

The printer section 2 comprises a printer CPU 20, a ROM 21, a RAM 22, a laser driver 23, a polygon motor driver 24, a conveyance control section 25, a process control section 26, a fixing control section 27, and an option control section 28.

The printer CPU 20 controls the entire printer section 2. The ROM 21 stores a control program and the like. The RAM 22 stores temporary data. The laser driver 23 drives a semiconductor laser oscillator (not shown). The polygon motor driver 24 drives a polygon motor not shown of an exposure device (not shown). The process control section 26 controls the process for charging, development, and transfer by use of a charger (not shown), a development roller, and a transfer device. The fixing control section 27 controls a fixing device (not shown). The option control section 28 controls options.

The image processing section 36, page memory 38, printer controller 39, image correction section 15, and laser driver 23 are connected such that they can mutually communicate with each other through an image data bus 120. In addition, the operation panel 40 has a liquid crystal display section 42, various operation keys 43, and a panel CPU 41 connected thereto, and is connected to the main CPU 31 such that they can mutually communicate with each other.

FIG. 2 shows a specific structure including at least a part of the image processing section 36 in an image forming apparatus such as a digital copying machine according to the embodiment of the present invention, and the flow of data of quantized image signals will be explained.

In this FIG. 2, a quantized image data signal 104 after pseudo gradation processing such as error diffusion is input to a pixel modulation section 101. Further, in this pixel modulation section 101, pixel value conversion is carried out for the purpose of pixel modulation and is thereafter output as an image data signal 105. This image data signal 105 expresses a pulse width of one pixel and corresponds to the laser drive time within the pixel.

A pulse position signal generation section 102 outputs a pulse position signal 106 indicating the laser drive position (left-end/right-end/center) within a pixel in the pulse width modulation section 103. This pulse position signal 106 is a signal having a constant cycle and is autonomously generated from inside. The pulse width modulation section 103 receives an image data signal 105 and a pulse position signal 106, and outputs a laser drive pulse 107 to the laser driver 23.

Suppose that the main scanning coordinate of a processing target image is expressed as x and that the remainder when an integer M is divided by an integer is expressed as M%N. Where the embodiment of the present invention adopts three-pixel modulation, a target pixel is expressed as $p(x\%3)$, and three consecutive pixels $p(0)$, $p(1)$, and $p(2)$ in the main scanning direction are considered as one set as shown in FIG. 3, and input data is of n bits ($2^n$ value).

Under this condition, values $p'(0)$, $p'(1)$, and $p'(2)$ of pixels after conversion according to a conventional method are expressed by any of the following expressions (1) and (2).

That is, $P'(0)=p(0)$ (processing target pixel values are directly output without conversion) is determined without restrictions.

Where $p(1)+p(2)>2^7-1$ is given, $$p'(1)=2^n-1$$

$$p'(2)=p(1)+p(2)-(2^n-1) \quad (1)$$

exists.

Where $p(1)+p(2) \leq 2^n-1$ is given, $$p'(1)=p(1)+p(2)$$

$$p'(2)=0 \quad (2)$$

exists.

In contrast, values $p'(0)$, $p'(1)$, and $p'(2)$ of pixels after conversion in the image forming apparatus according to the embodiment of the present invention are expressed by any of the following expressions (3), (4), and (5).

That is, where $p(1)+p(2)>2^n-1$ is given, $$p'(0)=p(0)$$

$$p'(1)=2^n-1$$

$$p'(2)=p(1)+p(2)-(2^n-1) \quad (3)$$

exists.

Where $p(1)+p(2) \leq 2^n-1$ is given, $$p'(0)=p(0)$$

$$p'(1)=p(0)+p(1)+p(2)$$

$$p'(2)=0 \quad (4)$$

exists.

Secondly, where $p(0)+p(1)+p(2)>2^n-1$, $$p'(0)=p(0)+p(1)+p(2)-(2^n-1)$$

$$p'(1)=2^n-1$$

$$p'(2)=0 \quad (5)$$

In the conventional method, $p(1)$ and $p(2)$ are merely added. In contrast, in the present embodiment, $p(0)$ is further added to $p(1)$. In this manner, pixels are concentrated on $p(1)$ so that a stable screen-line structure is formed.

Figure 5:
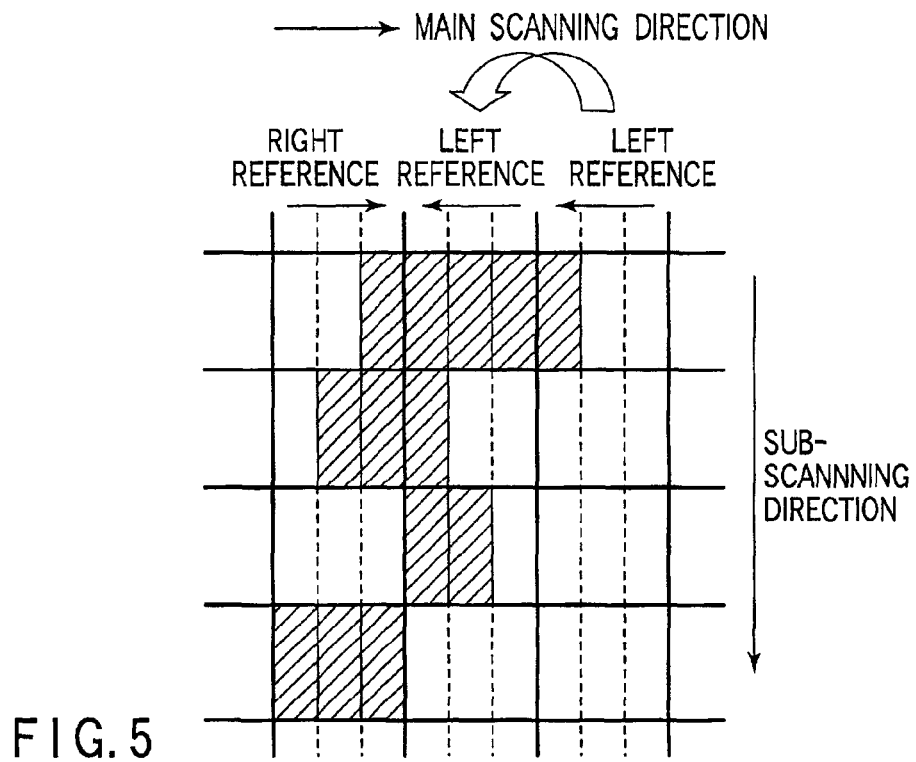
FIG. 5 is a view showing steps of specific image processing in the case of not adopting the method according to the present invention.
Figure 6:
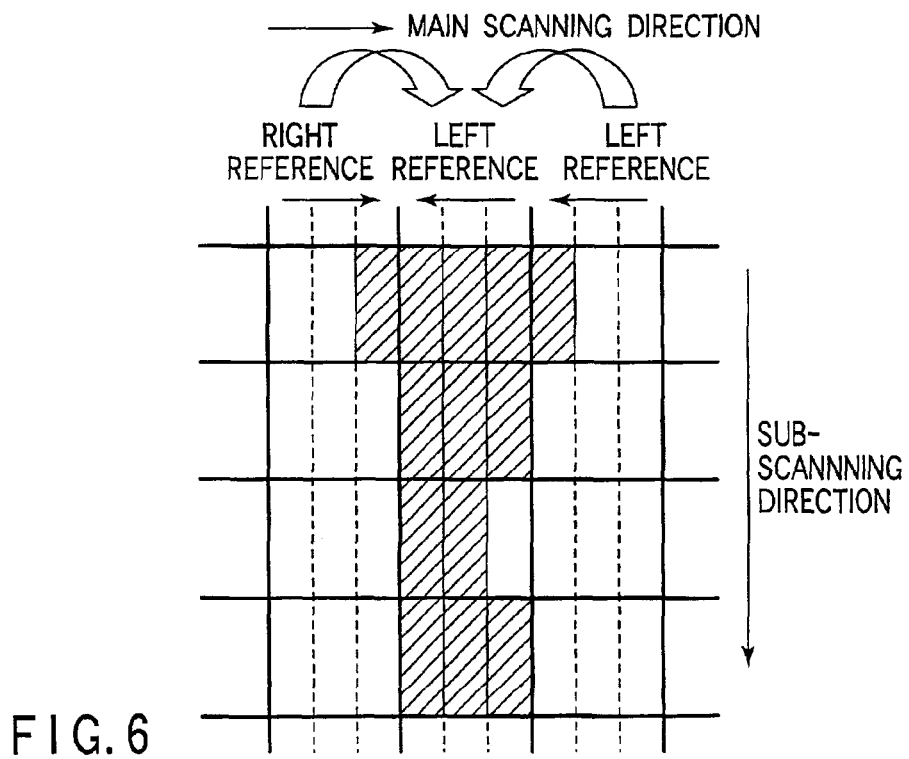
FIG. 6 is an explanatory view for steps of specific image processing in the case of adopting the method of image processing according to the present invention.

In the following, steps of specific processing based on the above expressions will be explained (the case of 4-value 3-pixel modulation) with reference to FIGS. 4 to 6.

FIG. 4 shows pixel values (0 to 3) of an image which is 4-valued after pseudo gradation processing such as error diffusion.

At first, with reference to FIG. 5, explanation will be made of the case where the method of the present invention is not used.

Where the pulse positions expression positions to which pixels are approximated are set in the order of right, left, and left, rearrangement of the pixel value $p(0)$ is not carried out in the method not using the present invention, and therefore, the continuity of pixels in the sub-scanning direction tends to break easily, so that the boundary between an image part and a non-image part increases, thereby constructing an unstable structure.

That is, for example the stages of FIG. 4, e.g., first stage $(p(0), p(1), p(2))=(1, 1, 3)$
second stage $(p(0), p(1), p(2))=(2, 0, 1)$
third stage $(p(0), p(1), p(2))=(0, 1, 1)$
fourth stage $(p(0), p(1), p(2))=(3, 0, 0)$ become as follows due to expression (1) or (2).

first stage $(p'(0), p'(1), p'(2))=(1, 3, 1)$
second stage $(p'(0), p'(1), p'(2))=(2, 1, 0)$
third stage $(p'(0), p'(1), p'(2))=(0, 2, 0)$
fourth stage $(p'(O), p'(1), p'(2))=(3, 0, 0)$ Meanwhile, with reference to FIG. 6, a method according to the present invention will be explained.

In the method according to the embodiment of the present invention, pixel values of $p(0)$ are rearranged with $p(1)$ situated at the center. In this manner, the continuity of pixels in the sub-scanning direction is improved.

That is, for example the stages of FIG. 4, e.g., first stage $(p(0), p(1), p(2))=(1, 1, 3)$
second stage $(p(0), p(1), p(2))=(2, 0, 1)$
third stage $(p(0), p(1), p(2))=(0, 1, 1)$
fourth stage $(p(0), p(1), p(2))=(3, 0, 0)$ become as follows due to expression (3), (4), or (5).

first stage $(p'(0), p'(1), p'(2))=(1, 3, 1)$
second stage $(p'(0), p'(1), p'(2))=(0, 3, 0)$
third stage $(p'(0), p'(1), p'(2))=(0, 2, 0)$
fourth stage $(p'(0), p'(1), p'(2))=(0, 3, 0)$ As has been explained above, in the method according to the present invention, for example, pixel values of all the consecutive three pixels in the main scanning direction are added and rearranged with the screen-line positions as references situated at the center in the 3-pixel modulation as described above. If the sum of the three pixels exceeds the maximum value of one pixel, rearrangement is further performed for the excessive portions.

In this manner, boundaries between image portions and non-image portions in the sub-scanning direction are reduced, so that a latent image formed on an intermediate recording medium is output as a stable image when it is subjected to toner development onto a medium such as paper. In addition, the frequencies of screen-lines and boundary lines of non-image portions are reduced (smoothened) so that high image quality is achieved.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image forming apparatus comprising:
   read means for reading image signals in units of a predetermined number of pixels;
   add means for adding pixel values of all consecutive pixels in a main scanning direction to concentrate image parts of image signals of pixels, which are read by the read means;
   convert means for rearranging the pixels beside a screen-line position, based on an addition result, and which rearranges and outputs an excessive value if the addition result exceeds the maximum value of one pixel;
   output means for outputting a laser beam based on the output signal of the conversion means;
   latent image forming means for forming a latent image on a photosensitive member by the laser beam; and
   image forming means for developing the formed latent image with toner to achieve image formation.

2. The apparatus according to claim 1, wherein,
   supposing that the predetermined number of pixels which are read by the read means is three and that the three consecutive pixels are p(0), p(1), and p(2), input data is of n bits ($2^n$ value), and values of the pixels are p'(0), p'(1), and p'(2),
   where $p(1)+p(2)>2^n-1$ is given, $p'(0)=p(0)$ $p'(1)=2^n-1$ $p'(2)=p(1)+p(2)-(2^n-1)$ exists,
   or where $p(1)+p(2)\leq 2^n-1$ is given, $p'(0)=p(0)$ $p'(1)=p(0)+p(1)+p(2)$ $p'(2)=0$ exists,
   and further, where $p(0)+p(1)+p(2)>2^n-1$, $p'(0)=p(0)+p(1)+p(2)-(2^{n-1})$ $p'(1)=2^{n-1}$ $p'(2)=0$ exists.

3. An image forming apparatus comprising:
   a read section which reads image signals in units of a predetermined number of pixels;
   a pseudo gradation processing section which performs pseudo gradation processing with respect to the image signals;
   a pixel conversion section which receives a quantized image data signal after the pseudo gradation processing, performs pixel value conversion for the purpose of pixel modulation, and outputs it as an image data signal;
   a pulse position signal generation section which outputs a pulse position signal indicating a laser drive position in a pixel;
   a pulse width modulation section which receives the image data signal and the pulse position signal, and outputs a laser drive pulse to a laser driver;
   a laser beam output section which outputs a laser beam based on the laser drive pulse;
   a latent image forming section which forms a latent image on a photosensitive member by the laser beam; and
   an image forming section which develops the formed latent image with toner to achieve image formation.

4. The apparatus according to claim 3, wherein the image data signal expresses a pulse width of one pixel and corresponds to the laser drive time for a pixel.

5. The apparatus according to claim 4, wherein the pulse position signal is a signal having a constant cycle and is autonomously generated inside the pulse position signal generation section.

6. An image forming method comprising:
   a first step of reading image signals in units of a predetermined number of pixels;
   a second step of adding pixel values of all consecutive pixels in a main scanning direction to concentrate image parts of the image signals of pixels which are read;
   a third step of rearranging the pixels beside a screen-line position based on an addition result, and of rearranging and outputting an excessive value if the addition result exceeds the maximum value of one pixel;
   a fourth step of outputting a laser beam based on the output signal;
   a fifth step of forming a latent image on a photosensitive member by the laser beam; and
   a sixth step of developing the formed latent image with toner to achieve image formation.

7. The method according to claim 6, wherein,
   in the third step, supposing that the predetermined number of pixels which are read in the first step is three and that the three consecutive pixels are p(0), p(1), and p(2), input data is of n bits ($2^n$ value), and values of the pixels are p'(0), p'(1), and p'(2),
   where $p(1)+p(2)>2^n-1$ is given, $p'(0)=p(0)$ $p'(1)=2^n-1$ $p'(2)=p(1)+p(2)-(2^{n-1})$ exists,
   or where $p(1)+p(2)\leq 2^n-1$ is given, $p'(0)=p(0)$ $p'(1)=p(0)+p(1)+p(2)$ $p'(2)=0$ exists,
   and further, where $p(0)+p(1)+p(2)>2^n-1$, $p'(0)=p(0)+p(1)+p(2)-(2^n-1)$ $p'(1)=2^n-1$ $p'(2)=0$ exists.

8. An image forming method comprising:
   a step of reading image signals in units of a predetermined number of pixels;

a step of performing pseudo gradation processing with respect to the image signals;

a step of receiving a quantized image data signal after the pseudo gradation processing, performing pixel value conversion for the purpose of pixel modulation, and outputting it as an image data signal;

a step of outputting a pulse position signal indicating the laser drive position for a pixel;

a step of receiving the image data signal and the pulse position signal, and outputting a laser drive pulse to a laser driver;

a step of outputting a laser beam based on the laser drive pulse;

a step of forming a latent image on a photosensitive member by the laser beam; and a step of developing the formed latent image with toner to achieve image formation.

9. The method according to claim 8, wherein the image data signal expresses the pulse width of one pixel and corresponds to the laser drive time for a pixel.

10. The method according to claim 8, wherein the pulse position signal is a signal having a constant cycle and is autonomously generated inside a pulse position signal generation section.

* * * * *